United States Patent
Risinger et al.

(10) Patent No.: US 10,599,600 B2
(45) Date of Patent: Mar. 24, 2020

(54) PERIPHERAL COMPONENT INTERCONNECT EXPRESS (PCIE) SWITCHING FOR MULTI-HOST COMPUTING SYSTEM DEPLOYMENTS

(71) Applicant: Western Digital Technologies, Inc., Irvine, CA (US)

(72) Inventors: James Risinger, Lafayette, CA (US); Nils E. Larson, San Jose, CA (US); Eric C. Lee, Denver, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 194 days.

(21) Appl. No.: 15/624,937

(22) Filed: Jun. 16, 2017

(65) Prior Publication Data
US 2018/0365185 A1    Dec. 20, 2018

(51) Int. Cl.
*G06F 13/40*    (2006.01)
*G06F 13/10*    (2006.01)
*G06F 13/42*    (2006.01)

(52) U.S. Cl.
CPC ........ *G06F 13/4022* (2013.01); *G06F 13/105* (2013.01); *G06F 13/4282* (2013.01); *G06F 13/4295* (2013.01); *G06F 2213/0026* (2013.01)

(58) Field of Classification Search
CPC .............. G06F 13/4022; G06F 13/105; G06F 2213/0026; G06F 13/4009
USPC ............................ 710/31, 33, 305, 313, 316
See application file for complete search history.

(56) References Cited

U.S. PATENT DOCUMENTS

| | | | | |
|---|---|---|---|---|
| 8,060,875 B1* | 11/2011 | Lambeth | ............... | G06F 9/5077 709/223 |
| 2009/0094399 A1* | 4/2009 | Daniel | ............... | G06F 13/4022 710/311 |
| 2009/0172240 A1* | 7/2009 | Slaight | ............... | G06F 13/4022 710/313 |
| 2013/0346531 A1* | 12/2013 | Hummel | ............. | G06F 13/4022 709/212 |
| 2014/0122765 A1* | 5/2014 | Subramaniyan | .... | G06F 13/4022 710/308 |
| 2015/0169487 A1* | 6/2015 | Subramaniyan | .... | G06F 13/4022 710/5 |
| 2015/0309951 A1* | 10/2015 | Breakstone | ......... | G06F 13/4022 710/313 |

(Continued)

*Primary Examiner* — Farley Abad
*Assistant Examiner* — Henry W Yu
(74) *Attorney, Agent, or Firm* — Vierra Magen Marcus LLP

(57) ABSTRACT

Described herein are enhancements for deploying a Peripheral Component Interconnect Express (PCIe) switch in a computing enclosure. In one implementation, a PCIe switch is coupled to a plurality of hosts and at least one network interface via PCIe lanes. The PCIe switch is configured to exchange communications between the plurality of hosts and the one or more physical network interfaces and emulate, to each host of the plurality of hosts, a physical network interface. The PCIe switch is further configured to receive a communication from a first host of the plurality of hosts directed at a second host in the plurality of hosts using an emulated physical network interface for the first host, and transfer the communication to the second host as though the communication were received at an emulated physical network interface for the second host.

20 Claims, 6 Drawing Sheets

(56) References Cited

U.S. PATENT DOCUMENTS

2015/0339246 A1* 11/2015 Sakurai .................. G06F 13/28
                                                                710/308
2016/0378510 A1* 12/2016 Ye ......................... G06F 9/4416
                                                                713/1
2017/0147456 A1*  5/2017 Lee ....................... G06F 13/404

* cited by examiner

PERIPHERAL COMPONENT INTERCONNECT EXPRESS (PCIE) SWITCHING FOR MULTI-HOST COMPUTING SYSTEM DEPLOYMENTS

BACKGROUND

Peripheral Component Interconnect Express (PCIe) is a high-speed serial computer expansion bus standard that is used to communicate between a host processing system and an expansion device. These expansion devices may comprise networking devices, storage devices, graphics processing devices, among other possible devices. To provide the communications, packets are transferred to and from the host processing system to provide the desired functionality. For example, when data is requested from a PCIe storage device, one or more packets are transferred to the host computing system over the PCIe lanes to the host processing system.

In some implementations, computing environments may employ a plurality of host computing systems to provide desired operations. In particular, the host computing systems may be used to form a cluster for data storage, data analysis, or other similar operations. Traditionally, these host computing systems may communicate via a physical network interfaces, such as Ethernet interfaces, to communicate with one another. However, these traditional network interfaces may not provide the required bandwidth and throughput desired by the processing systems on the hosts. Further, unnecessary overhead may be required in generating each packet for communication between the hosts.

OVERVIEW

Examples disclosed herein provide enhancements for providing Peripheral Component Interconnect Express (PCIe) switching in multi-host computing system deployments. In one implementation, a computing enclosure includes a plurality of hosts and a PCIe switch communicatively coupled to the plurality of hosts using PCIe lanes. The PCIe switch is configured to emulate to each host in the plurality of hosts a physical network interface, and receive a communication from a first host of the plurality of hosts directed at a second host in the plurality of hosts using an emulated physical network interface for the first host. In response to receiving the communication, the PCIe switch is configured to transfer the communication to the second host as though the communication were received at an emulated physical network interface for the second host.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only to the claims and their equivalents.

DETAILED DESCRIPTION

Figure 1:
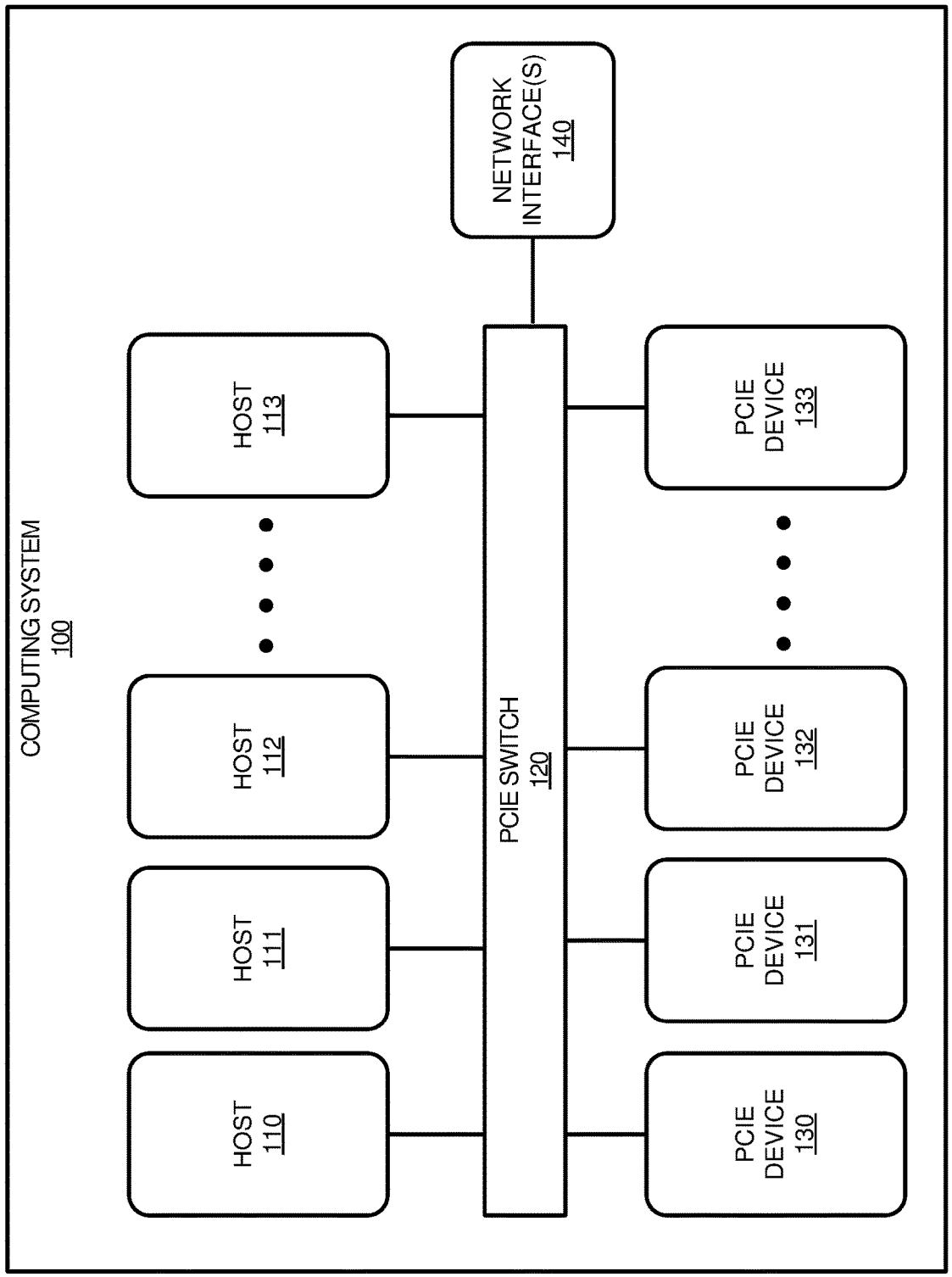
FIG. 1 illustrates a computing system to provide Peripheral Component Interconnect Express (PCIe) switching for a plurality of hosts according to an implementation.

FIG. 1 illustrates a computing system 100 to provide Peripheral Component Interconnect Express (PCIe) switching for a plurality of hosts according to an implementation. Computing system 100 includes hosts 110-113, PCIe switch 120, PCIe devices 130-133, and network interface(s) 140. Although illustrated in the present example with four hosts and four PCIe devices, it should be understood that fewer or additional hosts and PCIe devices may be coupled to PCIe switch 120.

In operation, PCIe switch 120 provides PCIe switching operations for hosts 110-113 and PCIe devices 130-133. In particular, when a communication is identified for a host to a PCIe device, PCIe switch 120 may route the communication to the appropriate device. Similarly, when data is communicated by one of PCIe devices 130-133 to a host, PCIe switch 120 may identify the appropriate host and forward the data to the identified host. For example, if PCIe device 130 comprised a data storage device, PCIe device 130 may communicate data to PCIe switch 120, wherein PCIe switch 120 may direct the data to the appropriate host of hosts 110-113. In many implementations, the operations of PCIe switch 120 may be transparent to the operations of hosts 110-113 and PCIe devices 130-133. Referring to the example of communicating data from a PCIe device to a host of hosts 110-113, the PCIe device may not identify that it is communicating with multiple hosts. Rather, based on the addressing or interrupt information provided by the PCIe device, PCIe switch 120 may identify the appropriate host associated with the addressing or interrupt and forward the data to the identified host.

In addition to the connectivity between hosts 110-113 and PCIe devices 130-133, PCIe switch 120 may further permit communications between hosts 110-113. To provide this connectivity, PCIe switch 120 may provide virtual networking for the hosts, wherein PCIe switch 120 may emulate a network interface to each host of hosts 110-113, which permits communications between the hosts. For example, if host 110 were attempting to communicate with host 111, host 110 may attempt to provide the communication to an emulated network interface (via a PCIe address associated with the emulated network interface) provided by PCIe switch 120. Once received, PCIe switch 120 may forward the communication to host 111 as if the communication were received at the emulated network interface for host 112.

While demonstrated in the present example as separate from PCIe devices 130-133, it should be understood that in some implementations network interface(s) 140 may be considered a PCIe device. Thus, similar to the communication operations provided by PCIe switch 120 to couple hosts 110-113 with PCIe devices 130-133, PCIe switch 120 may permit hosts to transfer and receive communications from network interface(s) 140.

Figure 2:
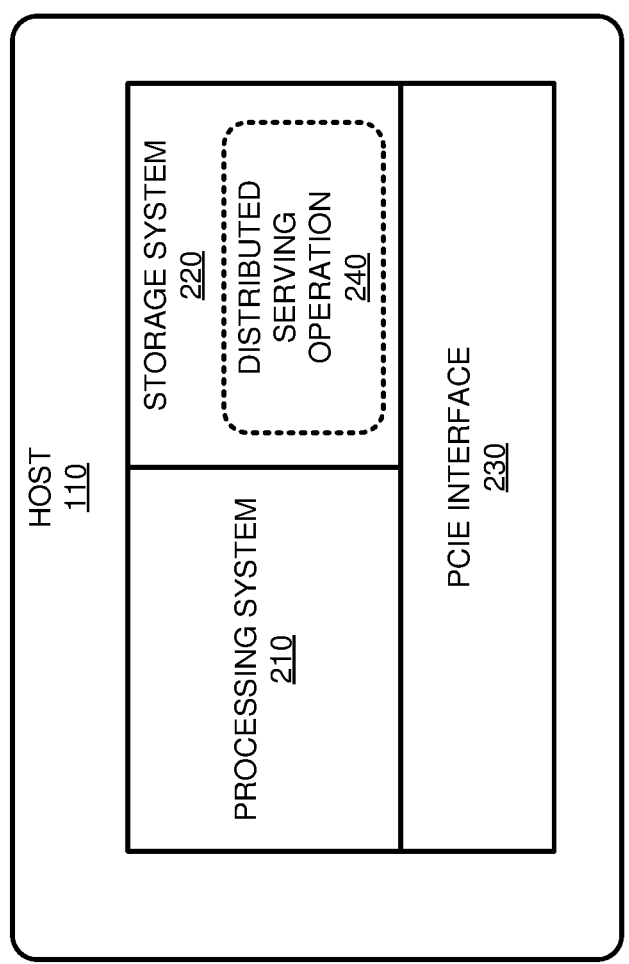
FIG. 2 illustrates a host capable of PCIe communication with one or more other hosts according to an implementation.

To further demonstrate the configuration of hosts 110-113, FIG. 2 is provided. FIG. 2 illustrates a host 110 capable of PCIe communication with one or more other hosts according to an implementation. Host 110 includes processing system 210, storage system 220, and PCIe interface 230, wherein PCIe interface 230 is communicatively coupled to processing system 210. Although illustrated in the example of FIG. 2 using host 110 from FIG. 1, it should be understood that each host of hosts 111-113 may comprise a similar configuration.

Processing system 210 comprises microprocessor and other circuitry that retrieves and executes software from storage system 220. Storage system 220 may each include volatile and nonvolatile, removable and non-removable media implemented in any method or technology for storage of information, such as computer readable instructions, data structures, program modules, or other data. Storage system 220 may each be implemented as a single storage device, but may also be implemented across multiple storage devices or sub-systems. Storage system 220 may comprise additional elements, such as a controller to read operating software. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

In operation, host 110 is communicatively coupled to a PCIe switch 120 using PCIe interface 230. When the host is initiated, host 110 may use PCIe interface 230 to communicate with PCIe devices 130-133, network interface(s) 140, and other hosts 111-113. In communicating with the other elements of computing system 100, in some implementations, distributed storage operation 240 may, when read and executed by processing system 210, direct processing system 210 to provide operations to support and store data for a distributed data storage application. In particular, distributed storage operations 240 may be representative of a storage application such as Ceph, GlusterFS, or some other similar distributed data storage application, wherein host 110 may represent a node to maintain the distributed storage system. For example, host 110 may provide a distributed file system alongside hosts 111-113, and may further communicate with one or more other hosts outside of computing system 100 to provide the distributed file system. In some implementations, when a write operation is received by host 110, host 110 may store the data locally to storage system 220. Storage system 220 may comprise hard disk media, solid state media, or some other similar media capable of storing data for a distributed file system. This media may be coupled to processing system 210 using a Small Computer System Interface (SCSI) bus, a Serial Attached SCSI (SAS) bus, Serial ATA (SATA) bus, Fibre Channel, or any other similar bus for transferring commands and exchanging data objects.

In at least one implementation, host 110 may use PCIe interface 130 to communicate with one or more devices of PCIe devices 130-133. These PCIe devices may comprise storage devices, such as Non-Volatile Memory express (NVMe) devices, which can be used for high speed storage for hosts 110-113. Thus, in addition to, or in place of, the storage systems coupled locally to the hosts, the host may store additional data to logical partitions of the storage devices. For example, host 110 may be allocated a logical partition with PCIe device 130. Based on this configuration host 110 may read and write data to the logical partition of PCIe device 130 over PCIe switch 120.

In some implementations, hosts 110-113 may be configured to communicate with one another to provide the distributed data storage operations. These communications may be used to duplicate data, monitor storage status information for each of the hosts, or provide other similar operations. To communicate with the other hosts 111-113, PCIe switch 120 may provide host 110 with an emulated physical network interface that can be used to provide communications with the other hosts. In particular, when host 110 is initiated in computing system 100, PCIe switch 120 may indicate the existence of a virtual network interface, such as an ethernet interface. As a result, host 110 may attempt to communicate with hosts 111-113 using the virtual network interface provided by PCIe switch 120. For example, if host 110 were to communicate with host 112, host 110 may initiate a communication directed at an address for the virtual network interface emulated to host 110. In response to receiving the communication, PCIe switch 120 may identify the corresponding destination host for the communication, and forward the communication to host 112 as if the communication were received at the emulated network interface for host 112. By providing this configuration, rather than requiring a modification to distributed data storage application on each of the hosts, the hosts may communicate using expected network interfaces. Thus, PCIe switch 120 may be used to provide virtual switching operations, such as ethernet switching operations, for the hosts within the computing system enclosure.

Although described in the previous examples as using PCIe devices 130-133 as data storage devices, PCIe devices 130-133 may further include graphics cards or some other supplemental processing system for hosts 110-113. These supplemental processing resources may permit hosts 110-113 to offload a portion of graphics intensive or mathematics intensive computations. As a result, when a computation is required, host 110 may communicate data for the computation to a PCIe address it uses for the PCIe device. Based on the addressing provided by the host, PCIe switch 120 may forward the required data to the appropriate PCIe device. Similarly, when communications are required with the host from the PCIe device, PCIe switch may identify any addressing information from the PCIe device and forward the communications to the required host.

Returning to the other elements of FIG. 1, PCIe switch 120 may comprise communication interfaces, network interfaces, processing systems, computer systems, microprocessors, storage systems, storage media, or some other processing devices or software systems, and can be distributed among multiple devices. Examples of PCIe switch 120 can include software such as an operating system, logs, databases, utilities, drivers, networking software, and other software stored on a computer-readable medium.

PCIe devices 130-133 may comprise storage devices, such as NVMe storage devices, graphical processing units, co-processing units, networking cards, or some other similar end PCIe device, including combinations thereof. PCIe devices 130-133 may each comprise one or more communication interfaces, network interfaces, processing systems, microprocessors, storage systems, storage media, or some other processing devices or software systems. In many implementations, PCIe devices 130-133 comprise single root input/output virtualization (SR-IOV) devices, which are capable of PCIe communication with multiple hosts.

Figure 3:
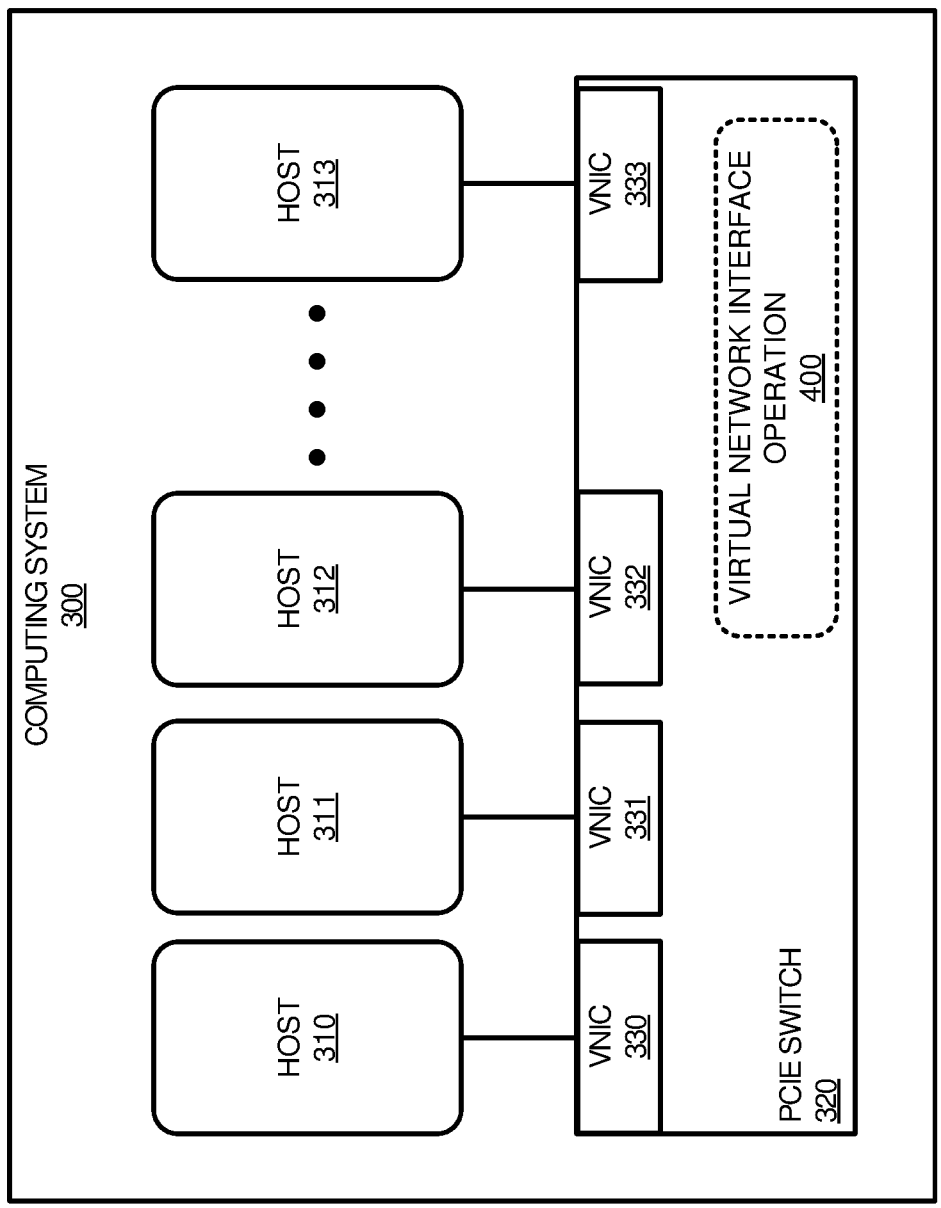
FIG. 3 illustrates a computing system to provide PCIe switching for a plurality of hosts according to an implementation.

FIG. 3 illustrates a computing system 300 to provide PCIe switching for a plurality of hosts according to an implementation. System 300 is representative of an enclosure such as a rackmount enclosure that comprise 1 U, 2 U, 4 U, 8 U, or some other similar rack mount enclosure. Computing system 300 includes hosts 310-313, and PCIe switch 320. Although illustrated in the example of FIG. 3 without PCIe devices, it should be understood that in some implementations PCIe switch 320 may further be communicatively coupled to additional PCIe devices for hosts 310-313.

In operation, when PCIe switch 320 is deployed with hosts 310-313, PCIe switch 320 provides a virtual network interface operation for hosts 310-313. In particular, for each host of hosts 310-313, PCIe switch 320 provides emulated or virtual network interfaces 330-333. These virtual network interfaces appear to the processing systems of hosts 310-313 as end PCIe devices similar to that of physical PCIe devices. Consequently, the hosts may address the network interfaces in a similar manner as any physical network interface. This permits hosts 310-313 to communicate locally with other hosts in the same computing system without modifying any networking communication software deployed on the hosts. For example, if hosts 310-313 were each executing as a node of a distributed data storage system, the nodes may be configured to communicate with other nodes of the storage system using virtual networking provided by PCIe switch 320.

While not illustrated in the present example of FIG. 3, it should be understood that the hosts 310-313 may communicate with hosts in one or more additional enclosures via physical network interfaces coupled to PCIe switch 320. Thus, when a communication is required locally, hosts 310-313 may communicate with one another using VNICs 330-333, whereas communications with hosts on separate enclosure may be directed at the physical NICs that support the connection with the other enclosure.

Figure 4:
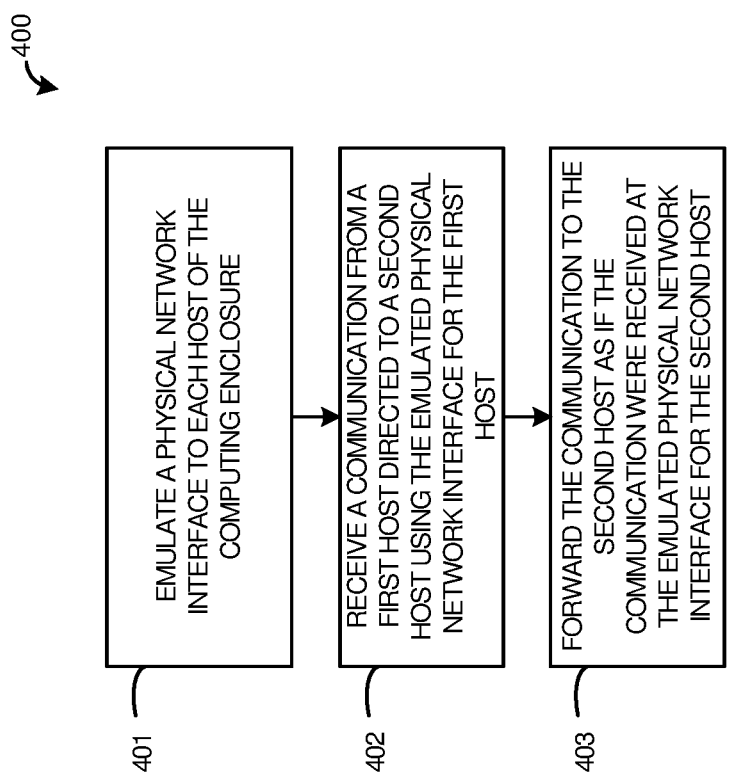
FIG. 4 illustrates a virtual network interface operation of a PCIe switch according to an implementation.

To further demonstrate the operations of PCIe switch 320, FIG. 4 is provided. FIG. 4 illustrates a virtual network interface operation 400 according to an implementation. The processes of operation 400 are referenced parenthetically in the paragraphs that follow with reference to the systems and elements of computing system 300 of FIG. 3.

As described previously with respect to FIG. 4, when computing system 300 is deployed, PCIe switch 320 is used to provide interconnectivity between the hosts, as well as any PCIe devices, such as storage devices, graphics cards, physical network interfaces, or other similar PCIe devices. To provide the connectivity with the various hosts of computing system 300, virtual network interface operation 400 directs PCIe switch to emulate a physical network interface to each host of computing system 300. In some implementations, the computing system 300 may represent a rackmount enclosure, such as a 1 U, 2 U, 4 U, or some other similar standardized server enclosure. In providing physical network interfaces to each of the hosts, PCIe switch 320 may be configured to identify a startup or initiation for each of the hosts, and provide the hosts with configuration information corresponding to VNICs 330-333. These VNICs permit the processing systems for each of the hosts to address the virtual network interfaces without identifying that the VNICs are not physical.

As a result of this configuration, virtual network interface operation 400 may receive (402) a communication from a first host directed to a second host using the emulated or virtual physical network interface for the first host, and will forward (403) the communication to the second host as if the communication were received at the emulated physical network interface for the second host. As an illustrative example, host 310 may generate a communication to support a distributed file system, wherein the communication is to be delivered to host 311. To provide the communication, host 310 may communicate, via the PCIe lanes between host 310 and PCIe switch 320, a communication directed at VNIC 330. In particular, host 310 may be provided with memory addressing that permits host 310 to initiate communications with VNIC 330. In response to receiving the communication, PCIe switch 320 will identify the communication, and forward the communication as directed to host 311. In forwarding the communication, PCIe switch 320 may make the packet appear to host 311 as though it has been received at VNIC 331. As a result, although the packet was never communicated over a physical network interface, such as an ethernet interface, PCIe switch 320 may be used to provide virtual networking between the physical hosts. This permits the software on the hosts to communicate with one another using a VNIC, limiting changes that are required by the hosts for inter-host communication. Thus, hosts 310 may be deployed as though they are coupled via a physical switch, such as an ethernet switch or other similar network element, and maintain addressing and communication operations as configured for the software on each of the hosts. Using the distributed storage system example, hosts 310-313 may exchange storage system information using internet protocol (IP) addressing or other similar network addressing, although the hosts are not connected via a physical network interface.

Although not illustrated in the present implementation, it should be understood that one or more physical network interfaces may be coupled to PCIe switch 320. These physical network interfaces may be used to couple hosts 310-313 with external clients that request data from a distributed storage system provided by hosts 310-313 and/or may be used to couple hosts 310-313 to one or more additional storage enclosures. These enclosures may include one or more hosts to support a distributed file systems as well as one or more PCIe devices, such as physical network interfaces, storage devices, graphics cards, and the like.

Additionally, while not demonstrated in the example of FIG. 3, it should be understood that PCIe switch 320 may further be communicatively coupled with one or more additional PCIe devices other physical network interfaces. PCIe switch 320 may be configured to identify PCIe communications between the hosts and the corresponding PCIe devices, and direct the communications to the required destination. In at least some implementations, when computing system 300 is initiated, hosts 310-313 may attempt to enumerate each of the PCIe devices that are available to the hosts via the available PCIe lanes. During this process, PCIe switch 320 may indicate the availability of VNICs 330-333 for hosts 310-313 respectively, and may further indicate the availability of any other PCIe devices coupled to the PCIe switch. For example, if a PCIe storage device were coupled to PCIe switch 320, PCIe switch 320 may identify a request from a host to identify the availability of the devices. Once the request is identified from the host, PCIe switch 320 may facilitate the enumeration operations to provide each of the hosts with addressing information for each of the PCIe devices. Similarly, for each of the PCIe devices, the devices may be provided with interrupt addressing to support operations and communications with each of the corresponding hosts.

Figure 5:
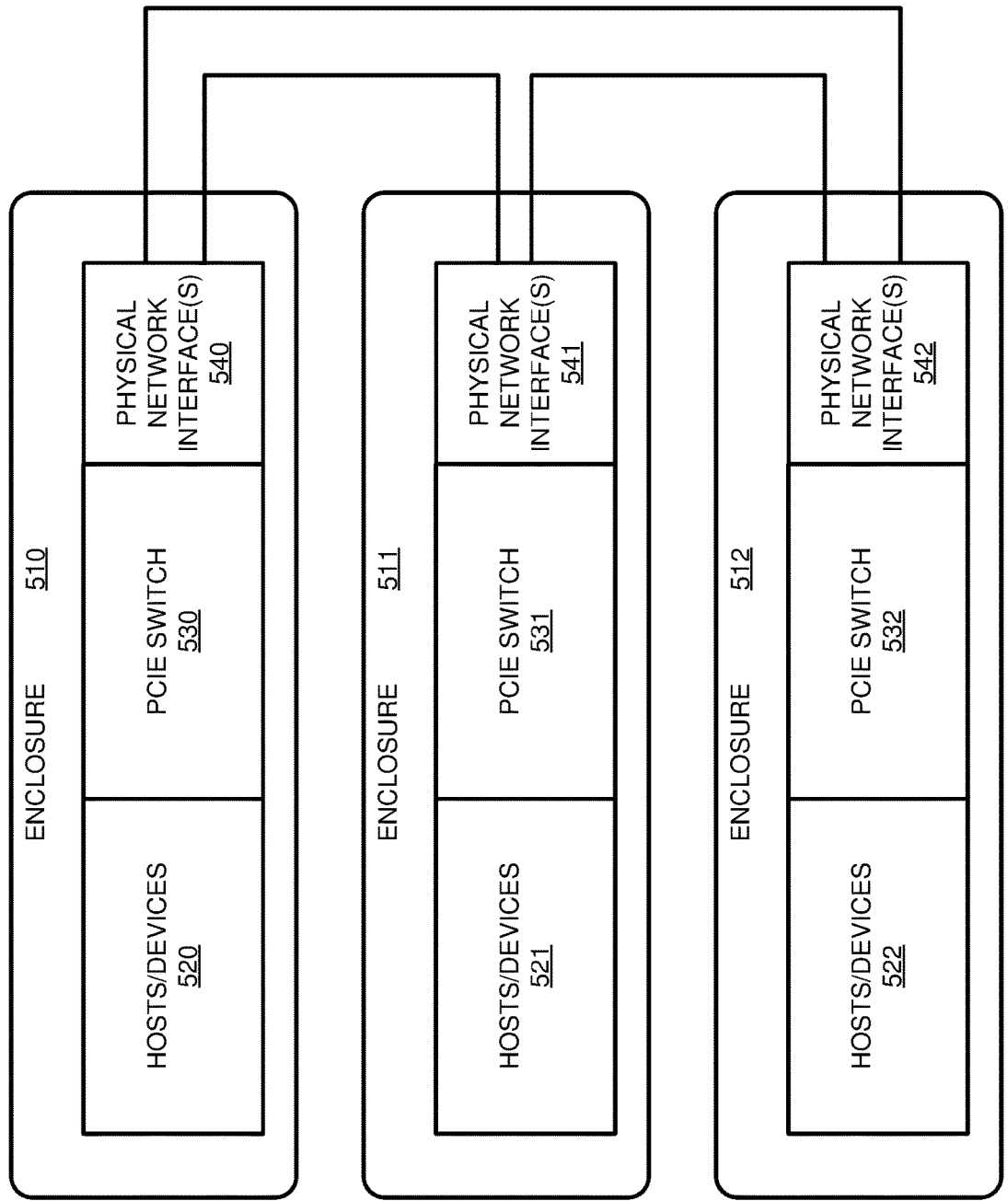
FIG. 5 illustrates a computing environment for coupling a plurality of computing system enclosures according to an implementation.

FIG. 5 illustrates a computing environment 500 for coupling a plurality of computing system enclosures according to an implementation. Computing environment 500 includes enclosures 510-512, which are communicatively coupled using physical network interfaces 540-542. Enclosures 510-512 further includes hosts/devices 520-522 and PCIe switches 530-532.

In operation, hosts/devices 520-522 represent hosts and PCIe devices that are communicatively coupled to PCIe switches 530-532, respectively. PCIe switches 530-532 provide PCIe switching functionality that permits multiple hosts to communicate with one or more PCIe devices. To provide the communications between the hosts and the PCIe devices, when initiated, PCIe switches 530-532 may assist in enumerating the PCIe devices for each of the hosts. In particular, PCIe switches 530-532 may permit each of the hosts to receive addressing information for the PCIe devices, and may further provide the PCIe devices with interrupt information to provide data to the corresponding hosts.

In some implementations, the configurations of the hosts and the PCIe devices may be used to provide a distributed storage system. To provide this configuration, each of the hosts may include a processing system, as well as a storage system coupled to the storage system to provide storage operations for the corresponding host. This storage system may be coupled to the host using SCSI, SATA, or some other similar storage bus. In addition to storing objects, such as files, locally in the storage system associated with the host, PCIe switch 530 may further permit one or more of the hosts on a particular enclosure to communicate with PCIe storage devices, wherein the PCIe switch may direct read and write operations to the corresponding to PCIe storage device. Additionally, to provide the communications between the plurality of hosts that execute in a single enclosure, PCIe switches 530-532 may be configured to provide emulated network interfaces to each of the hosts. These emulated network interfaces may permit each of the hosts to communicate as though they are communicating over a network (such as a local area network), although the communications are provided via the corresponding virtual switch. As a result, rather than modifying the distributed storage program processes operating on each of the hosts, the hosts may communicate with one another as though they are communicating over a network interface (using IP and/or media access control (MAC) addressing). Referring to an example with enclosure 510, a first host may be provided with an emulated physical network interface by PCIe switch 530. As a result, when a communication is required with a second host of enclosure 510, the first host may transfer the communication toward the emulated network interface provided by PCIe switch 530 with addressing information for the second host. When the communication is identified, PCIe switch may forward the communication to the second host as if the communication were received at the emulated network interface associated with the second host. Thus, the PCIe switches may be configured to provide a virtual switch to connect the various hosts on each of the enclosures.

Here, in addition to the operations provided by a single enclosure, computing environment 500 provides an implementation where multiple enclosures may be communicatively coupled via physical network interfaces 540-542. Physical network interfaces 540-542 are representative of PCIe network interfaces, such as ethernet interfaces, which can be used to provide communication between hosts over multiple enclosures. In particular, when initiated, each host on an enclosure may enumerate PCIe devices including physical network interface(s) 540-542 on the same enclosure. During the enumeration process, the hosts may identify the available devices, and allocate memory addressing, such that data may be written to and received from the appropriate device. As a result, using the example of enclosure 510, a host of enclosure 510 may enumerate at least one physical network interface of physical network interface(s) 540 to permit data exchanges with the network interface.

By permitting each of the hosts to have access to the physical network interfaces, hosts over multiple enclosures may communicate to provide the desired operations of a distributed storage system. For example, if a host in enclosure 510 required a communication with a host in enclosure 512, then a communication may be directed at a physical network interface of physical network interface(s) 540 via PCIe switch 530. Once the communication is received at one of physical network interface(s) 540, the communication may be transferred to an interface of enclosure 512. After receiving the communication, the communication may be forwarded to a corresponding host in enclosure 512. By providing this configuration, the size of a distributed storage system may be dynamically modified to support the required operations of a particular organization. For example, the organization may add additional enclosures to support additional storage requirements. Additionally, in some implementations, the PCIe slots for each of the enclosures may be dynamic such that hosts and/or devices may be added, removed, or replaced. This would permit a user to have an enclosure with a first number of hosts, but add or remove hosts as required. In some examples, administrators may further add or remove PCIe devices, such as storage devices, graphics cards, and the like as required. These PCIe devices may be added to empty PCIe slots within the enclosure or may be added by replacing a host or previously implemented PCIe slot. Thus, if an administrator required additional high speed storage, a NVMe drive may be added to an enclosure to support the required operations. Once added, the PCIe switch may be used in conjunction with the hosts to enumerate the added NVMe drive to make the storage available to the hosts.

Although not illustrated in the present example, it should be understood that in some examples PCIe switches 530-532 may communicate with one another via PCIe lanes instead of requiring communications over physical network interfaces 140-142. Additionally, while not demonstrated in the present example, it should be understood that one or more interfaces of physical network interfaces 540-542 may further be configured to communicate with client devices, wherein client devices may provide operations, such as read and write operations, with respect to the data managed by the hosts.

Figure 6:
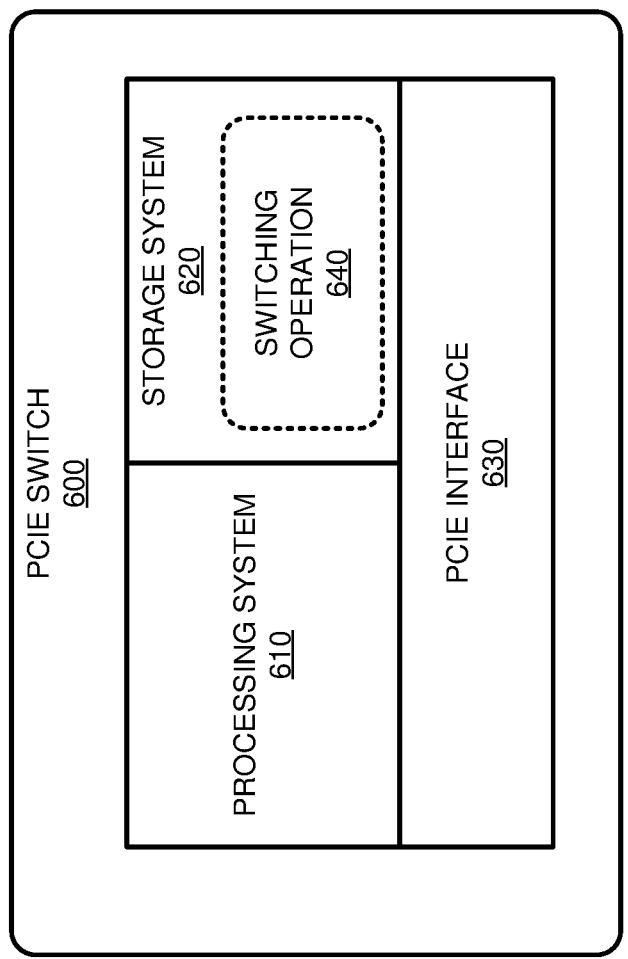
FIG. 6 illustrates a PCIe switch for providing communication between hosts and PCIe devices according to an implementation.

FIG. 6 illustrates a PCIe switch 600 for providing communication between hosts and PCIe devices according to an implementation. PCIe switch 600 is an example PCIe switch from FIGS. 1-5. PCIe switch 600 includes processing system 610, storage system 620, and PCIe interface 630.

In operation, PCIe switch 600 is deployed within a computing enclosure, such as a rackmount enclosure, wherein a plurality of hosts is coupled to the switch via PCIe interface 630. These hosts include at least a processing system and a storage system, wherein the storage system may be used in some implementations to store data for a distributed storage system provided by the plurality of hosts. In some examples, in addition to being coupled to hosts, PCIe interface 630 may be coupled to one or more PCIe devices, such as storage systems, graphics cards, and network interfaces.

Once the PCIe switch is coupled to the required elements and is deployed, switching operation 640 is executed by processing system 610 to provide the various operations described herein. Processing system 610 comprises microprocessor and other circuitry that retrieves and executes software from storage system 620. Storage system 620 may each include volatile and nonvolatile, removable and non-removable media implemented in any method or technology for storage of information, such as computer readable instructions, data structures, program modules, or other data. Storage system 620 may each be implemented as a single storage device, but may also be implemented across multiple storage devices or sub-systems. Storage system 620 may comprise additional elements, such as a controller to read operating software. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

In at least one implementation, switching operation 640, when read and executed by processing system 610, directs processing system 610 to manage enumeration traffic between the hosts and any PCIe devices coupled to the PCIe switch. This enumeration traffic may be used to provide addressing information to each of the hosts and the PCIe devices, such that the hosts may recognize any of the available devices and transfer and receive communications with the PCIe devices. For example, if a NVMe drive were attached to PCIe interface 630, then the hosts may use PCIe switch 600 to transfer and receive data with the NVMe storage device based on the enumeration addressing configuration for the NVMe storage device.

In addition to enumerating the physical PCIe devices for the various hosts of the enclosure, switching operation 640 may further direct processing system 610 to provide an emulated or virtual network interface, such as a virtual ethernet interface, to each of the host systems. This virtual network interface would permit software running on each of the hosts to communicate with one another without modifying the software to accommodate PCIe switching. In particular, to communicate with a second host, a first host may direct a communication at a virtual communication interface for the first host. Once identified, the communication may be forwarded to the second host, such that the second host identifies the packet as though it was received at the virtual communication interface for the second host. Advantageously, this permits PCIe switch 600 to provide a virtual network switch for the hosts within the same enclosure, and provide the hosts with internet protocol (IP) addressing, media access control (MAC) addressing, or other similar addressing to communicate with one another within the same enclosure. Thus, rather than requiring multiple ethernet or other similar network interfaces, the various hosts may be coupled using PCIe lanes and the PCIe switch.

In some implementations, in addition to providing connections between hosts and PCIe devices on the same enclosure, PCIe switch 600 may further facilitate communication between the hosts and one or more secondary enclosures. For example, PCIe interface 630 may be coupled via PCIe lanes to a ethernet network interface. This ethernet network interface may then be used to connect to other serving device enclosures, other enclosures with PCIe switching capability, or some other similar computing device capable of providing distributed operations.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A computing system comprising:
   a plurality of hosts;
   a network interface;
   a Peripheral Component Interconnect Express (PCIe) switch communicatively coupled to each of the plurality of hosts and to the network interface, wherein the PCIe switch:
   exchanges communication between the plurality of hosts and the network interface, and between the plurality of hosts;
   emulates, to each of the plurality of hosts, a virtual network interface;
   receives a communication from a first host of the plurality of hosts at the virtual network interface of the first host, wherein the communication is directed to a second host of the plurality of hosts; and
   forwards the communication received at the virtual network interface of the first host to the second host as if the communication was received at the virtual network interface of the second host.

2. The computing system of claim 1, further comprising one or more PCIe devices communicatively coupled to the PCIe switch, wherein the PCIe switch exchanges communications between the plurality of hosts and the one or more PCIe devices.

3. The computing system of claim 2, wherein the one or more PCIe devices comprise one or more data storage devices.

4. The computing system of claim 2, wherein the one or more PCIe devices comprise one or more Non-Volatile Memory express (NVMe) devices.

5. The computing system of claim 2, wherein the one or more PCIe devices comprise one or more graphics cards.

6. The computing system of claim 1, wherein the network interface comprises an Ethernet interface.

7. The computing system of claim 1, wherein the plurality of hosts, the network interface, and the PCIe switch are part of a first computing enclosure, and wherein the network interface is communicatively coupled to a second network interface of a second computing enclosure comprising a second plurality of hosts communicatively coupled to a second PCIe switch.

8. The computing system of claim 7, wherein the PCIe switch and the second PCIe switch facilitate communication between the plurality of hosts of the first computing enclosure and the second plurality of hosts of the second computing enclosure by:
   receiving at the PCIe switch a second communication from the first host to be directed to a third host of the second plurality of hosts;
   transfer by the PCIe switch the second communication to the second PCIe switch via the network interface of the first computing enclosure and the second network interface of the second computing enclosure; and transfer the second communication by the second PCIe switch from the second network interface to the third host.

9. The computing system of claim 1, wherein at least one of the plurality of hosts is configured to maintain a distributed file system.

10. The computing system of claim 1, wherein the virtual network interface is an ethernet interface.

11. A non-transitory computer-readable media comprising computer-readable instructions which when executed by a processing system of a Peripheral Component Interconnect Express (PCIe) switch communicatively coupled to a plurality of hosts and a network interface to facilitate communication between the plurality of hosts, and between the plurality of hosts and the network interface, causes the processing system to:
   emulate, to each of the plurality of hosts, a virtual network interface;
   receive a communication from a first host of the plurality of hosts at the virtual network interface of the first host, wherein the communication is directed to a second host of the plurality of hosts; and
   forward the communication received at the virtual network interface of the first host to the second host as if the communication was received at the virtual network interface of the second host.

12. The non-transitory computer-readable media of claim 11, wherein the PCIe switch is further communicatively coupled to one or more PCIe devices, and wherein the processing system comprises computer-readable instructions to exchange communications between the plurality of hosts and the one or more PCIe devices.

13. The non-transitory computer-readable media of claim 12, wherein the one or more PCIe devices comprise one or more data storage devices.

14. The non-transitory computer-readable media of claim 12, wherein the one or more PCIe devices comprise one or more Non-Volatile Memory express (NVMe) devices.

15. The non-transitory computer-readable media of claim 12, wherein the one or more PCIe devices comprise one or more graphics cards.

16. The non-transitory computer-readable media of claim 12, wherein the network interface comprises an Ethernet interface.

17. The non-transitory computer-readable media of claim 11, wherein the PCIe switch, the plurality of hosts, and the network interface are packaged in a rackmount enclosure, wherein the network interface is communicatively coupled to a second computing enclosure, and wherein the second computing enclosure comprises a second plurality of hosts communicatively coupled to a second PCIe switch.

18. The non-transitory computer-readable media of claim 11, wherein the plurality of hosts each comprise a storage system and a processing system.

19. The non-transitory computer-readable media of claim 11, wherein the plurality of hosts is configured to maintain a distributed file system.

20. A Peripheral Component Interconnect Express (PCIe) switch configured to be communicatively coupled to a plurality of hosts, the PCIe switch comprising:
   a processing system;
   a memory storing computer-readable instructions and operatively coupled to the processing system, the computer-readable instructions when executed by the processing system cause the processing system to:
      emulate, to each of the plurality of hosts, a virtual network interface;
      receive a communication from a first host of the plurality of hosts at the virtual network interface of the first host, wherein the communication is directed to a second host of the plurality of hosts; and
      forward the communication received at the virtual network interface of the first host to the second host as if the communication was received at the virtual network interface of the second host.

* * * * *